E. MUNSON.
Mill Spindle.
No. 9,859.
Patented July 19, 1853.
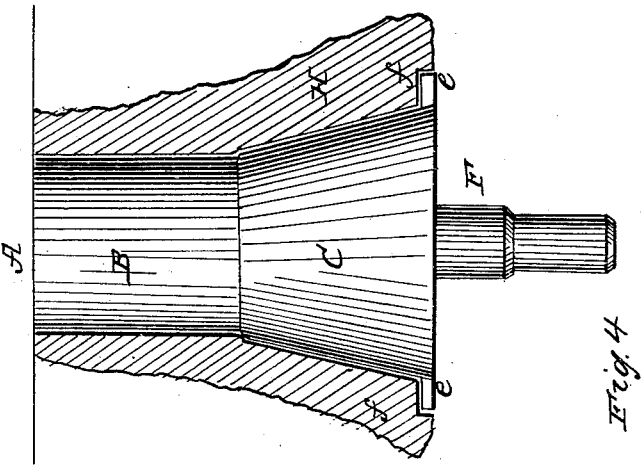
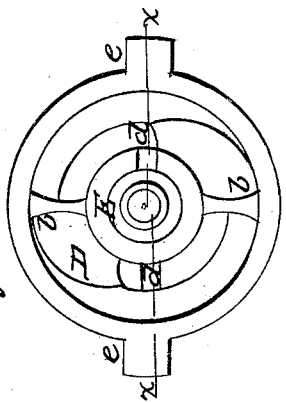
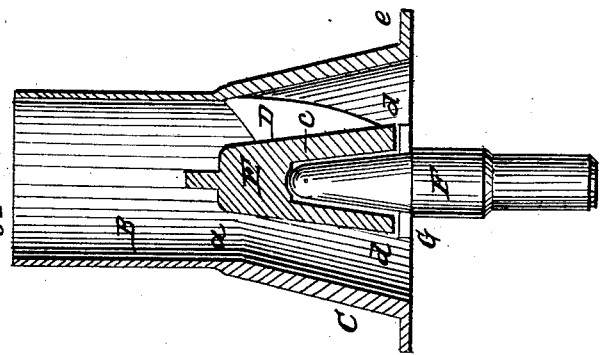
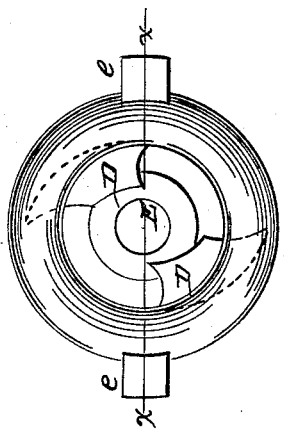

UNITED STATES PATENT OFFICE.

EDMUND MUNSON, OF UTICA, NEW YORK.

EYE FOR MILLSTONES.

Specification of Letters Patent No. 9,859, dated July 19, 1853.

*To all whom it may concern:*

Be it known that I, EDMUND MUNSON, of Utica, in the county of Oneida and State of New York, have invented a new and Improved Eye for Millstones; and I do hereby declare that the following is a full, clear, and exact description of the same, reference being had to the accompanying drawings, making a part of this specification, in which—

Figure 1, is an external view of the eye. Fig. 2, is a vertical section of ditto taken at the line $x$, $x$, Figs. 3 and 4. Fig. 3, is a plan or bird's eye view of ditto. Fig. 4, is an inverted plan or bottom view of ditto.

Similar letters of reference indicate corresponding parts in each of the several figures.

My invention consists in so constructing the eye of the stone that the central cone supporting the runner shall be sustained by spiral wings extending from the cone to the inner surface of the eye; these wings so constructed as to prevent choking and clogging; and causing a current of air to pass into the eye and between the stones, thus facilitating the feeding of the grain and also supporting the stone.

To enable others skilled in the art to make and use my invention, I will proceed to describe its construction and operation.

A, represents the eye constructed of any suitable metal, the upper portion B, as will be seen is a perfect cylinder, and the lower portion C, is conical, or in other words is the frustum of a cone, the conical portion being nearly one half of the whole height of the eye. Where the conical portion joins the cylindrical portion of the eye, an angle in the interior is avoided as will be seen by referring to (a) Fig. 2, this part of the eye being gradually rounded; in fact throughout the whole construction acute angles are avoided as they serve to lodge the material to be ground, and small quantities being thus lodged, they gradually increase in size until the eye is choked or clogged.

D, D, are spiral wings placed within the eye and extending the height of the conical portion C, see Fig. 2, one of the wings being seen, the other is cut off as this view is a vertical section. These flanches fit between the inner periphery or side of the conical portion of the eye and a center or cone E, which is also of conical form corresponding to the lower portion C, of the eye, the wings D, D, have rather a rapid pitch, as they curve only about one quarter of the periphery of the center or cone E, see Figs. 3 and 4. The faces of the wings are concave as will be seen by referring to Fig. 4, the concavity being distinctly seen on the bases (*b*) (*b*) of the wings. By having the concave faces the wings are not connected to the conical portion C, of the eye, and to the center or cone E, so as to form acute angles, the concavity is rather greater where the wings join the conical portion C, of the eye, because the grain or other substance to be ground is more liable to collect at these points owing to the centrifugal force caused by the revolving of the stone. The center or cone E, has a recess (*c*) within it to receive the upper part of the spindle F.

G, Fig. 2, is the driver which passes horizontally through the spindle, the driver being permanently attached to the spindle. The driver fits in recesses or grooves (*d*) (*d*) at the bottom of the center or cone E, see Figs. 2 and 4, the recesses or grooves (*d*) (*d*) being sufficiently deep as to cause the lower surface of the center or cone and the lower surface of the driver to be "flush" when the driver is fitted in the recesses.

The eye A, wings D, D, and the center or cone E, may be cast in one piece. The eye is secured permanently in the runner or stone H, by means of projections (*e*) (*e*) at the lower part of the conical portion C, these projections fit in recesses (*f*) (*f*) in the face of the stone, see Fig. 6.

The object in constructing the eye as described and employing the spiral wings as specified is to prevent the choking or clogging of the eye and to cause a current of air to pass into the eye and between the stones. The spiral wings it will be understood causes the current of air as they revolve, and they also agitate or prevent the grain or other substance from adhering as it passes down the eye, the concave faces of the wings affording no apt places for the grain to stick or adhere to the eye; but the important and distinguishing feature of my improvement is the support given by the spiral wings D D to the cone E which sustains the runner upon the spindle, thus uniting the function of feeding the grain with the sustaining of the stone.

I do not claim the conical form of a portion of the eye, nor do I claim a metallic eye, for they have been previously used and arranged in a variety of ways, but

What I claim as my invention and desire to secure by Letters Patent, is—

The spiral wings arranged in such manner as to perform the double office of feeding the grain and supporting the stone.

EDMUND MUNSON.

Witnesses:
MARTIN HART,
ALEXR. C. HART.